(12) United States Patent
Chew et al.

(10) Patent No.: US 10,189,714 B2
(45) Date of Patent: *Jan. 29, 2019

(54) OPERATION OF FLUIDIZED BED REACTORS BY OPTIMIZING TEMPERATURE GRADIENTS VIA PARTICLE SIZE DISTRIBUTION CONTROL

(71) Applicant: Corner Star Limited, Kowloon (HK)

(72) Inventors: Jia Wei Chew, Singapore (SG); Baisheng Zou, Pearland, TX (US)

(73) Assignee: Corner Star Limited, Hong Kong (HK)

( * ) Notice: Subject to any disclaimer, the term of this patent is extended or adjusted under 35 U.S.C. 154(b) by 0 days.

This patent is subject to a terminal disclaimer.

(21) Appl. No.: 15/814,112

(22) Filed: Nov. 15, 2017

(65) Prior Publication Data

US 2018/0072577 A1    Mar. 15, 2018

Related U.S. Application Data

(63) Continuation of application No. 14/650,959, filed as application No. PCT/US2013/078062 on Dec. 27, 2013, now Pat. No. 9,850,137.

(60) Provisional application No. 61/747,525, filed on Dec. 31, 2012.

(51) Int. Cl.
    *C01B 33/021* (2006.01)
    *B01J 8/18* (2006.01)

(52) U.S. Cl.
    CPC .......... *C01B 33/021* (2013.01); *B01J 8/1809* (2013.01); *B01J 2208/00017* (2013.01); *B01J 2208/00672* (2013.01); *B01J 2219/00247* (2013.01)

(58) Field of Classification Search
    CPC ............... C01B 33/021; B01J 8/1809; B01J 2208/00017; B01J 2208/00672; B01J 2219/00247
    See application file for complete search history.

(56) References Cited

U.S. PATENT DOCUMENTS

| | | | |
|---|---|---|---|
| 4,820,587 A | 4/1989 | Gautreaux et al. | |
| 4,883,687 A | 11/1989 | Gautreaux et al. | |
| 7,553,466 B2 | 6/2009 | Heiko | |
| 9,850,137 B2* | 12/2017 | Chew | ............ B01J 8/1809 |
| 2008/0299291 A1 | 12/2008 | Weidhaus et al. | |
| 2009/0324819 A1 | 12/2009 | Kulkarni et al. | |
| 2010/0068116 A1 | 3/2010 | Kim et al. | |

(Continued)

FOREIGN PATENT DOCUMENTS

WO    9641036 A2    12/1996

OTHER PUBLICATIONS

International Search Report and Written Opinion for PCT/US2013/078062, dated Apr. 2, 2014, 9 pgs.

(Continued)

*Primary Examiner* — Ngoc-Yen Nguyen
(74) *Attorney, Agent, or Firm* — Armstrong Teasdale LLP

(57) ABSTRACT

A method of improving the operation of polysilicon fluidized bed reactors is disclosed. The present disclosure is directed to the optimization of axial temperature gradients in gas-solid fluidized bed systems. Varying the width of the particle size distribution in the reactor alters the temperature gradient within the reactor, thereby providing a means of a better control of internal temperature profiles and hence better reactor performance.

17 Claims, 4 Drawing Sheets

(56) References Cited

U.S. PATENT DOCUMENTS

| | | |
|---|---|---|
| 2011/0212011 A1 | 9/2011 | Chu |
| 2012/0148728 A1 | 6/2012 | Vincente |
| 2013/0149228 A1 | 6/2013 | Tomas Martinez et al. |
| 2013/0295385 A1 | 11/2013 | Hertlein et al. |
| 2015/0217252 A1 | 8/2015 | Bucci et al. |

OTHER PUBLICATIONS

Sundaresan, Sankaran, "Some outstanding questions in handling of cohesionless particles," Powder Technology 115 (2001) pp. 2-7.

Muzzio, Fernando J., "Powder technology in the pharmaceutical industry: the need to catch up fast," Powder Technology 124 (2002) pp. 1-7.

Kunii, D. et al., Fluidization Engineering, Butterworth-Heinemann, Massachusetts, USA (1991), Abstract.

Rhodes, M., Introduction to Particle Technology, John Wiley & Sons Ltd., West Sussex, England (1998), Abstract.

Curtis, J. S., et al., "Modeling Particle-Laden Flows: A Research Outlook", AIChE J., 50 (2004), pp. 2638-2645.

Chew, J. W. et al., "Axial Segregation in Bubbling Gas-Fluidized Beds with Gaussian and Lognormal Distributions of Geldart Group B Particles", AIChE J., 56 (2010), pp. 3049-3061.

Chew, J. W. et al., "Link Between Bubbling and Segregation Patterns in Gas-Fluidized Beds with Continuous Size Distributions", AIChE J., 57 (2011), pp. 3003-3011.

Chew, J. W. et al., "Cluster characteristics of continuous size distributions and binary mixtures of Group B particles in dilute riser flow", Chemical Engineering Journal, 178 (2011), pp. 348-358.

Hrenya, C. M., "Kinetic Theory for Granular Materials: Polydispersity", S. Pannala, M. Syamlal, T. O'Brien (Eds.), Computational Gas-Solids Flows and Reacting Systems: Theory, Methods and Practice, IGI Global, Hersey, PA (2011), pp. 102-127.

Chew, J. W. et al., "Impact of material property and operating conditions on mass flux profiles of monodisperse and polydisperse Group B particles in a CFB riser", Powder Technology 214 (2011), pp. 89-98.

Fan, L. T. et al., "Recent Developments in Solids Mixing", Powder Technology 61 (1990), pp. 255-287.

Lim, K. S. et al., "Hydrodynamics of Gas-Solid Fluidization", Int. J. Muliphase Flow 21 (1995), pp. 141-193.

Kojima, T. et al., "Kinetic Study of Monosilane Pyrolysis for Poly-Crystalline Silicon Production in a Fluidized Bed", Journal of Chemical Engineering of Japan, 22 (1989), pp. 677-683.

\* cited by examiner

OPERATION OF FLUIDIZED BED REACTORS BY OPTIMIZING TEMPERATURE GRADIENTS VIA PARTICLE SIZE DISTRIBUTION CONTROL

CROSS-REFERENCES TO RELATED APPLICATIONS

This application is a continuation of U.S. patent application Ser. No. 14/650,959, filed Jun. 10, 2015 which is a U.S. National Phase Patent Application of International Application No. PCT/US2013/078062, filed Dec. 27, 2013, which claims the benefit of U.S. Provisional Patent Application No. 61/747,525, filed on Dec. 31, 2012, each of which is incorporated herein by reference in its entirety.

FIELD

A method of improving the operation of polysilicon fluidized bed reactors is disclosed. The present disclosure is directed to the optimization of axial temperature gradients in gas-solid fluidized bed systems. Varying the width of the particle size distribution in the reactor alters the temperature gradient within the reactor, thereby providing a means of a better control of internal temperature profiles and hence better reactor performance.

BACKGROUND

This disclosure relates to fluidized bed reactor systems for producing polycrystalline silicon. Polycrystalline silicon is a raw material used to produce many commercial products including, for example, integrated circuits and photovoltaic (i.e., solar) cells. Polycrystalline silicon is typically produced by a chemical vapor deposition mechanism in which silicon is deposited from a thermally decomposable silicon compound onto silicon seed particles in a fluidized bed reactor. These seed particles continuously grow in size until they exit the reactor as polycrystalline silicon particles product. Suitable decomposable silicon compounds include, for example, silane and halosilanes (e.g., trichlorosilane).

Polycrystalline seed particles may be added to the core bed to initiate deposition of silicon. A variety of reactions may take place in the core bed. Silicon deposits from silane onto a silicon particle, resulting in the particle growing in size. As the reaction progresses, silicon particles grow to a desired size and are removed from the core bed and new seed particles are added to the core bed.

Polydispersity is ubiquitous in flows involving solids, and such systems are known to exhibit different behaviors than monodisperse systems. Mixing and heat transfer characteristics change as particle size distributions evolve, and thus the effect of polydispersity on temperature gradients in fluidized bed reactors is of practical importance.

In gas-solid fluidized bed reactors, temperature is a critical parameter that contributes toward reactor performance. Temperature not only affects reaction kinetics, but affects the dynamics of the gas-solid system as well because of the effect on gas density and gas viscosity. Typically in commercial fluidized bed reactors, gas flow rates, freeboard pressures and power supply are controlled, but the actual temperature gradient within the bed is unmonitored.

Inevitably, temperature variations within the bed, especially axially, exist in fluidization applications, such as polysilicon reactors. Thus, temperature set-points based on a thermocouple strategically placed along the reactor wall is often not a good predictor of temperatures in other (axial) regions.

There remains a need, therefore, to better understand the impact of evolving particle size distributions on temperature profiles in fluidized bed reactors to allow for better control of such systems and to prolong the lifespan of reactors by alleviating hot spots within them. That is, there remains a need to recognize and understand the relationship between the width of the particle size distribution of granules in the bed reactor and the temperature in the reactor.

This section is intended to introduce the reader to various aspects of art that may be related to various aspects of the disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

SUMMARY

In a first aspect, a method of improving the operation of a polysilicon fluidized bed reactor is disclosed. The reactor has a distributor plate and a core bed. The method comprises adding polysilicon seeds having a pre-determined particle size distribution into the core bed of the fluidized bed reactor; measuring the width of the particle size distribution of granules in the bed, wherein the granules consist of a mixture of newly added seeds and previously added seeds; controlling the width of the particle size distribution of the granules in the bed by adjusting the frequency of seed addition into the reactor; and, withdrawing a polysilicon seed product from the bed.

In another aspect, a method of improving the operation of a polysilicon fluidized bed reactor is disclosed. The reactor has a distributor plate and a core bed. The method comprises adding polysilicon seeds having a pre-determined particle size distribution into the core bed of the fluidized bed reactor; measuring the width of the particle size distribution of granules in the bed, wherein the granules consist of a mixture of newly added seeds and previously added seeds; controlling the width of the particle size distribution of the granules in the bed by adjusting the pre-determined particle size distribution of the seeds; and, withdrawing a polysilicon seed product from the bed.

In yet another aspect of the present disclosure, a method of improving the operation of a polysilicon fluidized bed reactor is disclosed. The reactor has a distributor plate and a core bed. The method comprises adding polysilicon seeds having a pre-determined particle size distribution into the core bed of the fluidized bed reactor; measuring the width of the particle size distribution of granules in the bed, wherein the granules consist of a mixture of newly added seeds and previously added seeds; controlling the width of the particle size distribution of the granules in the bed by adjusting the frequency of seed addition into the reactor and adjusting the pre-determined particle size distribution of the seeds; and, withdrawing a polysilicon seed product from the bed.

Various refinements exist of the features noted in relation to the above-mentioned aspects. Further features may also be incorporated in the above-mentioned aspects as well. These refinements and additional features may exist individually or in any combination. For instance, various features discussed below in relation to any of the illustrated embodiments may be incorporated into any of the above-described aspects, alone or in any combination.

BRIEF DESCRIPTION OF THE DRAWINGS

Corresponding reference characters indicate corresponding parts throughout the several views of the drawings.

DETAILED DESCRIPTION OF THE INVENTION

Figure 1:
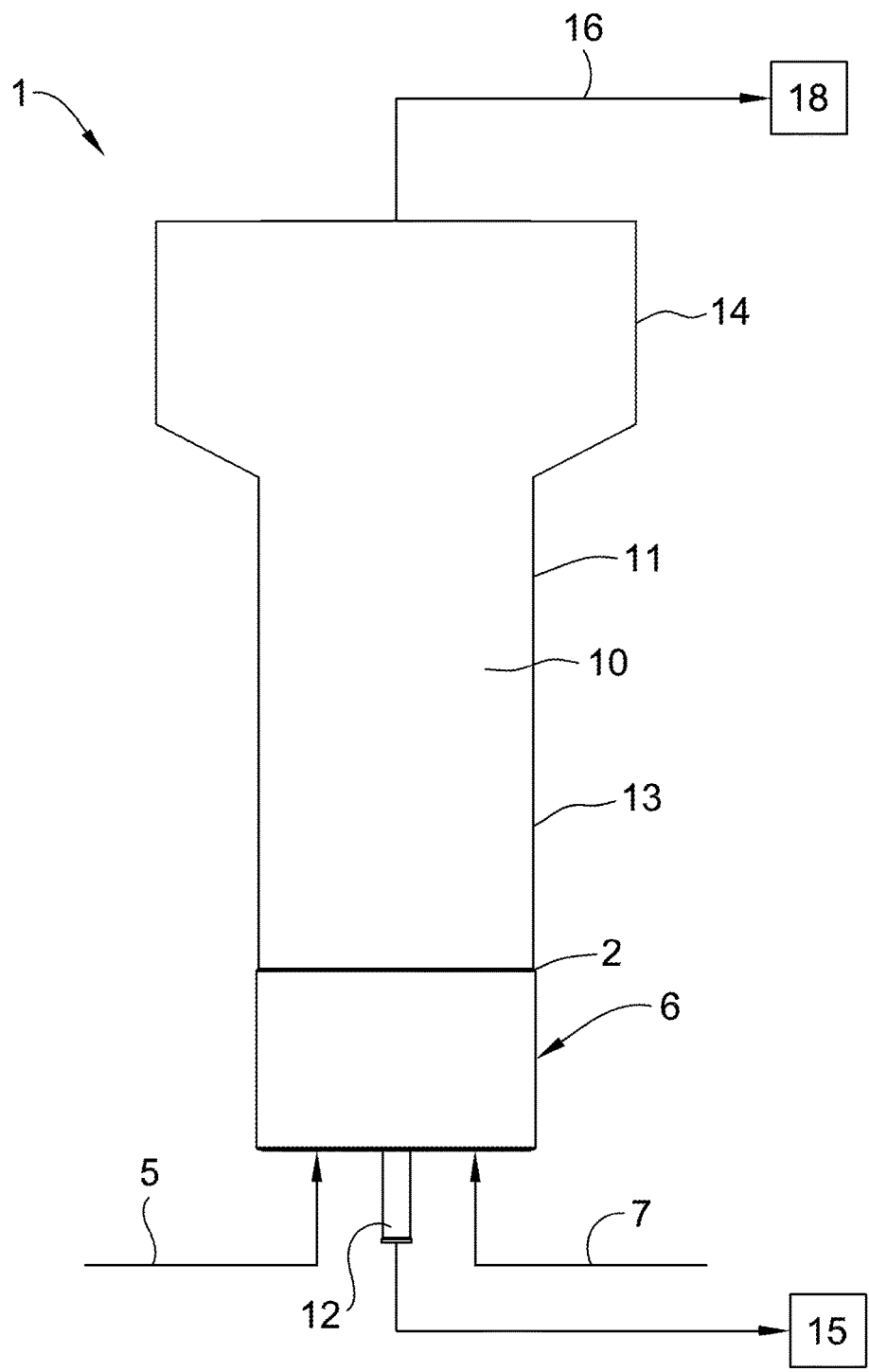
FIG. 1 is a schematic of a fluidized bed reactor suitable for use in accordance with the present disclosure with flows into and out of the reactor being shown.

The present disclosure is directed to optimizing axial temperature gradients in gas-solid fluidized bed systems, such as polysilicon reactors. In particular, it has been discovered that by varying the width of the particle size distribution in the reactor, the temperature gradients within the reactor may be altered. Since the effect of temperature is significant, for example, both in reaction kinetics and fluid dynamics, controlling the width of the particle size distribution in the reactor provides a means of a better control of internal temperature profiles, which leads to better reactor performance.

The present disclosure, therefore, is directed to methods of improving the operation of a polysilicon fluidized bed reactor. The polysilicon fluidized bed reactors have a distributor plate and a core bed. The methods include adding polysilicon seeds having a pre-determined particle size distribution into the core bed of a fluidized bed reactor; measuring the width of the particle size distribution of granules in the bed, wherein the granules consist of a mixture of newly added seeds and previously added seeds; controlling the width of the particle size distribution of the granules in the bed; and, withdrawing a polysilicon seed product from the bed.

In one embodiment, the width of the particle size distribution of the granules in the bed may be controlled by adjusting the frequency of seed addition into the reactor. In another embodiment, the width of the particle size distribution of the granules in the bed may be controlled by adjusting the pre-determined particle size distribution of the seeds. In yet another embodiment of the present disclosure, the width of the particle size distribution of the granules in the bed may be controlled by adjusting the frequency of seed addition into the reactor and adjusting the pre-determined particle size distribution of the seeds. In yet another embodiment, the width of the particle size distribution of the granules in the bed may be controlled by adjusting the frequency of product withdrawal from the reactor.

Fluidized Bed Reactor

It should be noted that any reactor capable of carrying out the reactions described herein may be used without departing from the scope of the present disclosure. Such reactors are generally described as fluidized bed reactors. Furthermore, the process of embodiments of the present disclosure may carry out the reaction in a single fluidized bed reactor or may incorporate one or more fluidized bed reactors configured in series or in parallel.

The fluidized bed reactor may comprise a distributor plate, a core bed (also known in the industry as a "reaction chamber"), a gas distribution unit and a product withdrawal tube.

Core Bed

The reactor core bed is typically a fluidized bed in which silicon particles are suspended by an upward flow of the fluidizing gas in the reactor. Fluidized bed reactors provide high mass transfer and heat transfer rates between growing silicon particles and the gas phase which enhances the deposition rate of silicon onto the particles. The fluidized bed reactor is generally a cylindrical vertical vessel; however, any configuration that is acceptable to fluidized bed operations may be utilized. The particular dimensions of the reactor will primarily depend upon system design factors that may vary from system to system such as the desired system output, heat transfer efficiencies and system fluid dynamics, without departing from the scope of the present disclosure. Typically, extraneous heat is used to cause the temperature of the thermally decomposable gas to increase to the point at which the gas decomposes. Methods for heating include, for example, capacitive heating, induction coils and electrical resistance elements.

Referring now to FIG. 1, an exemplary fluidized bed reactor 1 for carrying out the processes of the present disclosure is generally designated as numeral 1. The reactor 1 includes a reactor core bed 10 and a distributor plate 2.

In some embodiments, a single feed gas may be used in the in reactor 1. In other embodiments, multiple feed gases may be used in the reactor 1. FIG. 1 represents an exemplary embodiment wherein two feed gases are used in the reactor 1. The first feed gas 5 and a second feed gas 7 are introduced into the plenum 6 to distribute the respective gases into the inlet of the reactor core bed 10. In this regard, it should be understood that as used herein, "first feed gas" is a gas with different physical properties than the "second feed gas" and vice versa. The first feed gas and second feed gas can compose a plurality of gaseous compounds as long as the mass composition or molar composition of at least one of the compounds in the first feed gas is different than the composition of that compound in the second feed gas.

A product withdrawal tube 12 extends through the plenum 6. Product particles can be withdrawn from the tube 12 and transported to product storage 15. The reactor core bed 10 may include a lower region 13, a freeboard region 11, and an expanded region 14, which has a larger radius than the lower region 13 and the freeboard region 11. The lower region 13 is denser than the freeboard region 11 and the expanded region 14. Further, the lower region 13 can be the particle-rich region of the reactor. The freeboard region 11 is located higher than the lower region 13 and is less dense than the lower region 13. Additionally, the freeboard region 11 is generally a particle-poor region.

Gas travels upward in the reactor core bed 10 from the lower region 13 and enters the freeboard region 11. In the expanded region 14, the gas velocity decreases causing entrained particles to fall back into the lower region 13. Spent gas 16 exits the core bed 10 and can be introduced into a further processing unit 18. In this regard, it should be understood that the reactor 1 shown in FIG. 1 is exemplary and other reactor designs may be used without departing from the scope of the present disclosure (e.g., reactors that do not include an expanded region).

Feed Gas

Thermally decomposable silicon compounds include compounds generally capable of being thermally decomposed in a gas phase to produce silicon. Additional products may be produced from the decomposition process, without departing from the scope of the present disclosure, as long as it provides a source of silicon to grow the polysilicon particles to form polysilicon granules. Thermally decomposable silicon compound gases include all gases containing silicon that can be heterogeneously deposited by chemical vapor deposition, such as silicon tetrahydride (commonly referred to as silane), trichlorosilane and other silicon halides, wherein one or more of the hydrogen atoms of silane is substituted with a halogen such as chlorine, bromine, fluorine and iodine.

In one embodiment, the thermally decomposable silicon compound is silane. The chemical vapor deposition (CVD) of silane is slightly exothermic, typically goes substantially to completion, is nearly irreversible, and may be initiated at a lower temperature of about 600° C. compared to silicon halide gases such as trichlorosilane, which typically requires a temperature of at least about 1100° C. In addition, silane and its decomposition products, i.e., silicon vapor and hydrogen, are non-corrosive and non-polluting. In comparison, the decomposition of trichlorosilane is a reversible and incomplete reaction which results in the production of byproducts which are corrosive. In general, therefore, silane is a preferred gas for use in embodiments of the present disclosure, although other thermally decomposable gases containing silicon may be utilized without departing from the scope of the present disclosure.

The thermally decomposable compound may be introduced into the reactor without dilution or the gas may be diluted with a carrier gas such as hydrogen, argon, helium or combinations thereof. During decomposition, by-product hydrogen is produced that may be used as needed as a carrier gas for additional quantities of thermally decomposable feed gas in the operation of the reactor system.

Reaction Conditions

During operation of the reaction system, the fluidizing gas velocity through the reaction zone is maintained above the minimum fluidization velocity of the silicon particles. The gas velocity through the reactor is generally maintained at a velocity of from about one to about eight times the minimum fluidization velocity necessary to fluidize the particles within the fluidized bed. In some embodiments, the gas velocity is from about one to about two times and, in at least one embodiment, is about 1.5 times the minimum fluidization velocity necessary to fluidize the particles within the fluidized bed. The minimum fluidization velocity varies depending on the properties of the gas and particles involved. The minimum fluidization velocity may be determined by conventional means.

The minimum fluidization velocity is preferably calculated for conditions as they exist near the gas distributor. Using these conditions, which include temperatures that are normally cooler than the rest of the reactor, it is possible to ensure the minimum fluidization velocity calculated be sufficient to fluidize the entire bed.

At elevated temperatures above the distributor, the viscosity and velocity variables utilized to calculate the minimum fluidization velocity are heat sensitive and may result in a minimum fluidization velocity that is not sufficient to fluidize the bed at the cooler temperatures of the lower portions of the bed. Therefore, by calculating a minimum fluidization velocity based on the cooler conditions, it is possible to ensure the calculation of the lowest fluidization gas velocity that will fluidize the entire bed. Although the present disclosure is not limited to specific minimum fluidization velocities, minimum fluidization velocities useful in the present disclosure range from about 0.7 cm/sec to about 350 cm/sec or even from about 6 cm/sec to about 150 cm/sec.

Gas velocities higher than the minimum fluidization flow rate are often desired to achieve higher productivities. As the gas velocity increases beyond the minimum fluidization velocity, the excess gas forms bubbles, increasing the bed voidage. The bed can be viewed to consist of bubbles and "emulsion" containing gas in contact with silicon particles. The quality of the emulsion is quite similar to the quality of the bed at the minimum fluidization condition. The local voidage in the emulsion is close to the minimum fluidization bed voidage. Hence, bubbles are generated by the gas introduced in excess of what is required to achieve the minimum fluidization. As the ratio of actual gas velocity to the minimum fluidization velocity increases, the bubble formation intensifies. At a very high ratio, large slugs of gas are formed in the bed. As the bed voidage increases with the total gas flow rate, the contact between solids and gases becomes less effective. For a given volume of the bed, the surface area of solids in contact with reacting gases decreases with increasing bed voidage. Thus, for the given bed length, the conversion of thermally decomposable gas decreases. Conversion may also decrease for reduced gas residence times. In addition, different undesired reactions can take place at higher rates producing more fines.

The temperature in the reactor is maintained within the decomposition temperature range of the thermally decomposable compound and the melting point temperature of silicon. The temperature of the reactor may be maintained from about 700° F. to about 1400° F., but may be adjusted within the parameters of this disclosure. For example, as detailed elsewhere throughout this disclosure, the temperature within the reactor, such as an axial temperature gradient, may be maintained at a desired level through control of the width of the particle size distribution of the granules in the bed. The heat that is used to maintain the reaction zone at such temperatures may be provided by conventional heating systems such as electrical resistance heaters disposed on the exterior of the reactor vessel wall. The pressure in the reactor is typically from about 1.70 to about 1.80, preferably about 1.73 atmosphere at the top of the bed.

Addition of Polysilicon Seeds to Reactor Bed

The process of the present disclosure involves polysilicon particles in a fluidized bed reactor to make high purity polysilicon. Polycrystalline "seed" particles are added to the core bed to initiate deposition of silicon. The seed particles generally continue to grow in size until they exit the reactor as particulate polycrystalline silicon product. In some instances, the particles may grow in size but then shrink in size due to attrition. The source of silicon seed particles include product particles collected from the reactor that are ground to the desired size and/or small polycrystalline particles gathered with and separated from the granular polycrystalline product.

Once the seeds are added to the core bed of the reactor, the seeds will grow inside of the core bed reactor as a result of, for example, silane deposition. Also, while the seeds are in the bed, they may shrink in size after they have grown due to attrition over time. Thus, there may be a combination of newly added seeds in the core bed of the reactor and seeds that were previously added that have now grown in size and/or that have shrunk in size due to particle attrition over time. In accordance with the present disclosure, the combination of newly added polysilicon seeds and seeds that were previously added in the reactor are referred to as "granules."

In accordance with the present disclosure, "newly added" refers to seeds that have been added to the reactor that have not yet grown in size and/or shrunk due to particle attrition. Thus, once a seed has entered the reactor, if it has not changed its size, it is considered a "newly added" seed.

In one embodiment of the present disclosure, the polysilicon seed particles added into the core bed of the reactor have a pre-determined particle size (i.e., Sauter mean diameter) distribution that ranges from about 50 µm to about 600 µm, and more typically from about 200 µm to about 400 µm. In another embodiment, the seeds have a pre-determined particle size distribution ranging from about 50 µm to about 150 µm, from about 150 µm to about 250 µm, from about 250 µm to about 350 µm, from about 350 µm to about 450 µm, from about 450 µm to about 550 µm, or from about 550 µm to about 600 µm. In this regard, it should be understood that references herein to the "mean diameter" of various particles refers to the Sauter mean diameter unless stated otherwise. The Sauter mean diameter may be determined according to methods generally known by those of skill in the art.

Once the seeds have been added, a variety of reactions may take place in the core bed. For example, in a silane system, silane may typically heterogeneously deposit onto growing crystal particles. Silane may also decompose to produce silicon vapor which can homogenously nucleate to form undesirable silicon dust (synonymously referred to as silicon "fines" or "powder") and which can deposit on the growing silicon particles. The silicon fines can grow in size by deposition of silicon from silane or from silicon vapor. The fines can agglomerate to form larger fines. Silicon fines can also combine with larger growing silicon particles, i.e., the silicon fines may be scavenged by the larger growing silicon particles.

The seed particles may be added to the reactor batchwise or continuously. In one embodiment of the present disclosure, the seeds are added to the reactor from about every 60 minutes to about every 600 minutes. In another embodiment, the seeds are added to the reactor from about every 150 minutes to about every 300 minutes.

Measuring and Controlling the Width of the Particle Size Distributions

Measuring the Width of the Particle Size Distributions

After the polysilicon seeds have been added into the core bed of the reactor, the width of the particle size distribution of the granules in the bed is measured. As noted elsewhere in this disclosure, the granules consist of a mixture of newly added seeds and previously added seeds. The distribution of the granules changes continuously as a result of, for example, the growth of the granules, formation of fines, addition of seeds, withdrawal of polysilicon product, and particle attrition.

The width of the particle size distribution of the granules is defined as the ratio of standard deviation ($\sigma$) of mass-weighted particle size distribution to the Sauter mean diameter ($d_{sm}$). In a preferred embodiment of the present disclosure, the $d_{sm}$ of the granules is about 925 µm.

The width of the particle size distribution of the granules in the bed may be measured by means generally known in the art, for example, through the use of a particle size analyzer known in the art. Other exemplary methods of measuring include, but are not limited to, sieve measurements, laser diffraction, and dynamic light scattering.

In an exemplary embodiment, the method for measuring the width of the particle size distribution is done by obtaining a sample of the granules through the product withdrawal tube. The granules are then analyzed using particle sizing methods generally known in the art, such as sieve measuring, laser diffraction, and dynamic light scattering. Particle size analysis can be done either offline (e.g., using sieves) or online (e.g., using laser diffraction).

Exemplary offline measurements include, for example, sieving. In sieve measurements, a sample is collected, then manually sieved, and the measurements are then manually recorded. An exemplary online measurement includes a sampling loop that can be set up to collect a sample of granules, send the sample through a particle analyzer to get results in real time, and then the sample is returned to the reactor.

Controlling the Width of the Particle Size Distributions

In accordance with the present disclosure, it has been surprisingly found that by controlling the width of the particle size distribution of the granules in the bed, one can control axial temperature profiles within the fluidized bed reactor. By controlling the temperature profiles in the bed reactors, it is possible to prolong the lifespan of the reactor by, for example, alleviating hot spots within the reactor. Thus, by controlling the width of the particle size distribution of the granules in the bed, one can better control a fluidized bed reactor and improve the overall operation of a fluidized bed reactor.

In the embodiments of the present disclosure, the width of the particle size distribution of the granules in the bed can be controlled by: (1) adjusting the frequency of seed addition into the reactor; (2) adjusting the pre-determined particle size distribution of the seeds; (3) adjusting the frequency of product withdrawal from the reactor; or (4) any and all combinations of (1)-(3).

In gas-solid fluidized bed reactors, temperature can be a critical parameter contributing toward reactor performance. Specifically, temperature not only affects reaction kinetics, but also affects the dynamics of the gas-solid system because of the effect on gas density and gas viscosity. Typically in commercial fluidized bed reactors, gas flow rates, freeboard pressures and power supply are controlled, but the actual temperature gradient within the bed is unmonitored. Inevitably, temperature variations within the bed, especially axially, exist in fluidization applications. As a result, temperature set-points based on a thermocouple placed along the reactor walls are often not a good predictor of temperatures in other (axial) regions.

The inventors of the present disclosure have discovered that the polydisperse nature of silicon particles (i.e., the myriad of particle sizes and/or particle material densities) have an effect on the temperature gradients in the bed. As such, in order to optimize reactor performance, one must first understand the impact of evolving particle size distributions of the granules in the bed. The particle sizes in the bed evolve due to, for example, particle attrition or particle growth.

When the width of the particle size distribution of the granules changes with time, conventional operational parameters and/or feedback control loops do not incorporate the effect of particle size distributions of the granules. The present disclosure has identified that axial temperature profiles within the bed vary significantly as the width of the particle size distribution of the granules changes. The methods disclosed herein provide a way to control the operation of fluidized bed reactors.

Relying on a fixed set of operating conditions (e.g., pressure, temperature, flow rates) without taking particle size distribution width into account is problematic and counter-productive because temperature gradients are shown to vary significantly as particle size distribution widths of the granules change. Thus, the methods of the present disclosure are able to improve the temperature control of fluidized bed reactors and hence overall reactor performance.

In the case of polysilicon reactors, a uniform axial temperature profile is desirable to reduce the silicon build-up in a reactor that occurs due to unexpected hot spots and to better control fluidization dynamics of the reactor. Thus, in one embodiment, maintaining a wider particle size distribution width is beneficial.

Moreover, the frequency of seed addition to the bed is important to control the width of the particle size distribution. With, for example, online measurement of particle size distribution, the duration between seed addition can be optimized to maintain a target particle size distribution width so that one may maintain desired temperature profiles. By being able to maintain desired temperature profiles, one can increase the lifespan of the reactor by alleviating build-up of silicon on the reactor walls and distributor.

In one embodiment of the present disclosure, the width of the particle size distribution of the granules in the bed is controlled by adjusting the frequency of seed addition into the reactor. The seeds may be added to the reactor from about every 60 minutes to about every 600 minutes. In another embodiment, the seeds by may be added to the reactor from about every 150 minutes to about every 300 minutes. Since shorter intervals will lead to wider particle size distributions and longer intervals will lead to narrower particle size distributions, one may operate the fluidized bed reactor using a feedback control loop to adjust the frequency of the seed addition in order to achieve a desired particle size distribution width in the bed, which, in turn, leads to a desired temperature profile within the bed. That is, through the use of a feedback control loop, one can then increase or decrease the seed addition frequency to achieve a desired temperature profile. For example, a desired setpoint for the particle size distribution width can be implemented and the controls of the particle analyzer will automatically increase or decrease the frequency of seed addition to increase or decrease the particle size distribution width.

In another embodiment of the present disclosure, the width of the particle size distribution of the granules in the bed is controlled by adjusting the pre-determined particle size distribution of the seeds. The pre-determined particle size of the seeds may be from about 50 μm to about 600 μm when added into the bed. In another embodiment, the pre-determined particle size of the seeds may be from about 200 μm to about 400 μm. In yet another embodiment, the pre-determined particle size distribution of the seeds may be from about 50 μm to about 150 μm, from about 150 μm to about 250 μm, from about 250 μm to about 350 μm, from about 350 μm to about 450 μm, from about 450 μm to about 550 μm, or from about 550 μm to about 600 μm.

The pre-determined particle size distribution of the seeds may be selected from these ranges in order to achieve a desired width of the particle size distribution of the granules in the bed, and thus achieve a desired temperature profile. By adjusting $d_{sm}$ and $\sigma/d_{sm}$, the seeds may be optimized to obtain desired temperature profiles.

In yet another embodiment, both the frequency of seed addition and the pre-determined particle size distribution of the seeds may be adjusted in order to control the width of the particle size distribution of the granules in the bed.

As noted elsewhere in this disclosure, the width of the particle size distribution of the granules in the bed can be defined as the ratio of standard deviation (σ) of mass-weighted particle size distribution to the Sauter mean diameter ($d_{sm}$). In a preferred embodiment of the present disclosure, the $d_{sm}$ of the granules is about 925 μm.

In one embodiment of the present disclosure, the width of the particle size distribution ($\sigma/d_{sm}$) of the granules in the bed is from about log 0.05 to about log 0.50, preferably from about log 0.10 to about log 0.46. In another embodiment, the $\sigma/d_{sm}$ is from about log 0.05 to about log 0.15, from about log 0.20 to about log 0.25, or from about log 0.40 to about log 0.50.

When the granules are within the core bed, the height of the granules in the bed is normalized with respect to the bed height, such that a height of 0 represents the distributor plate and a height of 1.0 represents the top of the reactor bed. In an exemplary embodiment, the normalized height of the granules in the bed is from about 0.4 to about 1.0. That is, in one embodiment the $\sigma/d_{sm}$ of the granules in the bed is controlled such that the granules are elevated to a normalized height in the bed of from about 0.4 to about 1.0.

By controlling the width of the particle size distribution, either through adjustment of the frequency of seed addition, adjustment of pre-determined particle size distribution, adjustment of the frequency of withdrawal of the product from the reactor, or any combinations of these three, the inventors of the present disclosure have discovered that one can control temperature profiles within the core bed. Specifically, by controlling the $\sigma/d_{sm}$ of the granules in the bed, one can achieve a uniform temperature profile within the core bed. As such, a user of the fluidized bed reactor can obtain improved performance in the reactor by optimizing the temperature gradients.

For example, in one embodiment, the width of the particle size distribution of the granules is controlled so that the temperature in the fluidized bed reactor is from about 1000° F. to about 1300° F. when the granules are at a normalized height of from about 0.4 to about 1.0 in the core bed. Within this range, the width of the particle size distribution of the granules can be controlled so that the temperature in the fluidized bed reactor is from about 1000° F. to about 1100° F., from about 1150° F. to about 1225° F., or from about 1250° F. to about 1325° F. when the granules are at a normalized height of from about 0.4 to about 1.0 in the core bed.

When controlling the width of the particle size distribution of the granules in the bed, the particle size distribution with the lowest $\sigma/d_{sm}$ will have the steepest temperature gradient. In contrast, the particle size distribution with the highest $\sigma/d_{sm}$ will have the "gentlest" temperature gradient, meaning that the uniformity of the temperature profile will peak at the lowest temperature (see FIG. 3, for example). Those in the art using the methods disclosed herein may prefer a steep gradient climb or a more gentle gradient climb. A steep temperature gradient climb may be useful, for example, to help keep the distributor plate cold and avoid any issues with overheating. In other embodiments, a gentler gradient climb—and thus a wider particle size distribution—is beneficial to reduce the silicon build-up in a reactor that occurs due to unexpected hot spots and to better control fluidization dynamics of the reactor.

Figure 3:
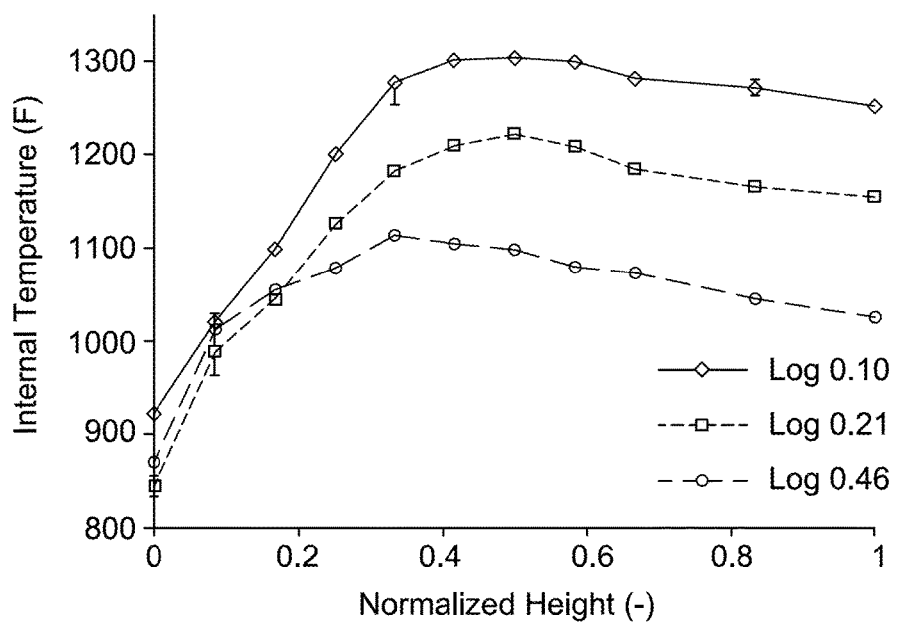
FIG. 3 is a graphical depiction of the temperature profiles of varying widths of particle size distributions under the same operating conditions with hydrogen as the fluidizing gas.

In another embodiment, as shown in FIG. 3, the width of the particle size distribution of the granules in the bed is controlled to be from about log 0.40 to about log 0.50 and the resulting temperature in the core bed is from about 1000° F. to about 1100° F. when the normalized height of the granules is from about 0.4 to about 1.0 in the core bed. Thus, by controlling the width of the particle size distribution of the granules in the bed to be between about log 0.40 to about log 0.50, a user is able to achieve a uniform temperature profile within the core bed to be from about 1000° F. to about 1100° F., and, when this occurs, the granules are at a normalized height of from about 0.4 to about 1.0 within the core bed. By obtaining such a desired temperature profile, the lifespan of the reactor can be lengthened by alleviating build-up of silicon on the reactor walls and on the distributor plate.

Also shown in FIG. 3, other desired temperature profiles can be obtained when the width of the particle size distribution of the granules in the bed can be controlled to be from about log 0.20 to about log 0.25 and the resulting temperature in the core bed is from about 1150° F. to about 1225° F. when the normalized height of the granules is from about 0.4 to about 1.0 in the core bed. In yet another embodiment shown in FIG. 3, the width of the particle size distribution of the granules in the bed can be controlled to be from about log 0.05 to about log 0.15 and the resulting temperature in the core bed is from about 1250° F. to about 1325° F. when the normalized height of the granules is from about 0.4 to about 1.0 in the core bed.

During the controlling of the width of the particle size distributions of the granules in the bed, as shown in FIG. 3, the temperature in the fluidized bed reactor may typically be lowest at the distributor plate and highest about halfway up the height of the core bed (i.e., about a normalized height of 0.5).

In one embodiment of the present disclosure, the effect of particle size distribution on temperature profiles persists in two different, fluidizing gases with different physical properties. In an exemplary embodiment, the two different gases can be hydrogen and argon. These particular gases have different physical properties such as viscosity, density, molecular weight, heat capacity and thermal conductivity. In another embodiment, the impact of particle size distributions on temperature profiles reduces when fluidizing gas flow rates increase. For example, if two different gases are used, such as hydrogen and argon, when mass flow rates are increased by 20%, the temperature gradients generally become less steep and the difference between the various widths diminishes.

Withdrawal of Polysilicon Product from Reactor

Polysilicon seeds that are added into a fluidized bed reactor and that grow are eventually withdrawn from the reactor as a polysilicon product. As shown in FIG. 1, polycrystalline silicon (i.e., polysilicon) is withdrawn from the product withdrawal tube 12. Particulate polycrystalline silicon may be withdrawn from the reactor intermittently as in batch operations; however, it is preferred that the particulate product be withdrawn continuously.

In another embodiment of the present disclosure, the width of the particle size distribution of the granules in the bed is controlled and/or further controlled by adjusting the frequency of polysilicon seed product withdrawal from the reactor. In one embodiment, the polysilicon seed product is withdrawn from the reactor from about every 15 minutes to about every 100 minutes. As a result of inherent size segregation of the particles within the core bed, larger particles are preferentially withdrawn from the withdrawal tube, which modifies the mean particle size and the particle size distribution within the core bed.

Regardless of whether batch or continuous withdrawal of silicon product is used, it has been found that the size of the product particles when withdrawn from the reactor influences the reactor productivity. For instance, it has been found that generally increasing the size of the withdrawn silicon particulate results in increased reactor productivity; however if the product particles are allowed to grow too large, contact between the gas and solid phases in the reactor may be reduced thereby reducing productivity. Accordingly, in various embodiments of the present disclosure, the particle size (i.e., the Sauter mean diameter) of the particulate polycrystalline silicon that is withdrawn from the reactor is from about 600 μm to about 2,000 μm, from about 800 μm to about 1200 μm or from about 900 μm to about 1100 μm.

The following example is illustrative and is not intended to limit the scope of the disclosure.

EXAMPLE

In this Example, controlled experimental conditions were used and temperatures at various axial positions in the core bed were measured for different widths of log normal particle size distributions. In this Example, the width of the particle size distribution of the granules in the bed is defined as $\sigma/d_{sm}$, wherein $d_{sm}$ is kept constant at 925 μm and particle size distributions with a $\sigma/d_{sm}$ ranging between about log 0.10 and about log 0.46 were investigated.

Figure 2:
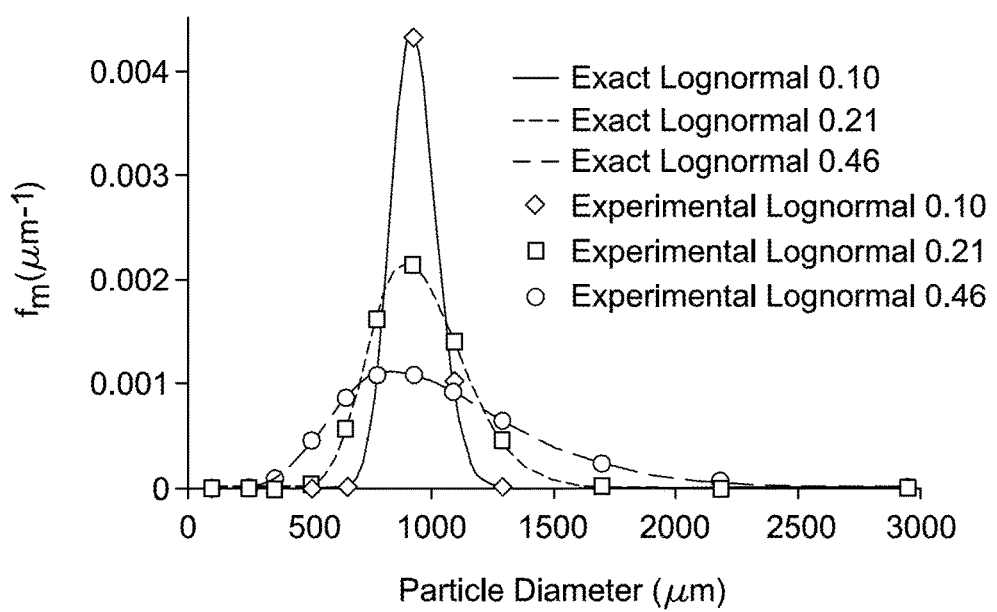
FIG. 2 is a graphical depiction of particle size distributions with $d_{sm}=925$ μm and varying $\sigma/d_{sm}$.

As shown in FIG. 2, $f_m$ is the mass fraction of each sieve cut normalized with respect to bin size (for a better comparison among sieve cuts of different widths). The continuous lines are plotted per the log normal equation, while the discrete points are the sieve fractions of polysilicon particles with $\rho_s$=2330 kg/m$^3$. The lowest limit of $\sigma/d_{sm}$ is log 0.10 because of the limitation in this Example imposed by the sieves available, while the upper limit of $\sigma/d_{sm}$ in this Example is log 0.46 because of the increased difficulty of fluidizing the biggest particles as the particle size distribution widens.

FIG. 3 depicts the temperature profiles of three different widths of particle size distributions when all operating parameters—hydrogen flow rate, freeboard pressure, and power supply—are kept constant. The y-axis shows the bed temperature measured and the x-axis represents the normalized height of the bed from the distributor plate. As can be seen in the results of this Example in FIG. 3, the uniformity of the temperature profiles is dependent on the width of the particle size distribution of the granules, with the uniformity of the temperatures improving as the $\sigma/d_{sm}$ of the particle size distribution increases. Also, FIG. 3 shows that the temperatures are generally much higher for the narrowest particle size distribution width, even though the power supply in the bed was the same for each particle size distribution.

Quantitatively, comparing the narrowest ($\sigma/d_{sm}$=log 0.10) and the widest ($\sigma/d_{sm}$=log 0.46) particle size distributions, the temperatures at the distributor plate (0") varies by about 80° F., while the maximum bed temperature (at an approximate normalized height of about 0.5) varies by as much as about 200° F. These temperature differences give significantly different reaction rates and fluidization dynamics. With respect to the reaction rates for this Example, the dependence on temperature of the heterogeneous reaction rate is given as $$r=2.65\times10^8\exp(-23273/T)C_A \qquad (1)$$

Wherein r is the reaction rate, T is temperature, and $C_A$ is the concentration of silane. Accordingly, in this Example, the reaction rate differs by about 10 times between the narrowest and the widest particle size distribution at the distributor plate, and by more than about 28 times in the hottest regions of the core bed.

Consequently, without understanding of the impact of polydispersity and the corresponding ability to predict failure modes, the planning of maintenance schedules to fix the bed reactors is hampered. In addition, with respect to fluidization dynamics, the ratio of the superficial gas velocity to complete fluidization velocity ($U_g/U_{cf}$) varies in this Example by up to about 20%.

Thus, this Example shows that by understanding the effect of the widths of particle size distributions of granules in the bed, one can control the fluidized bed reactor to achieve better overall performance.

Figure 4:
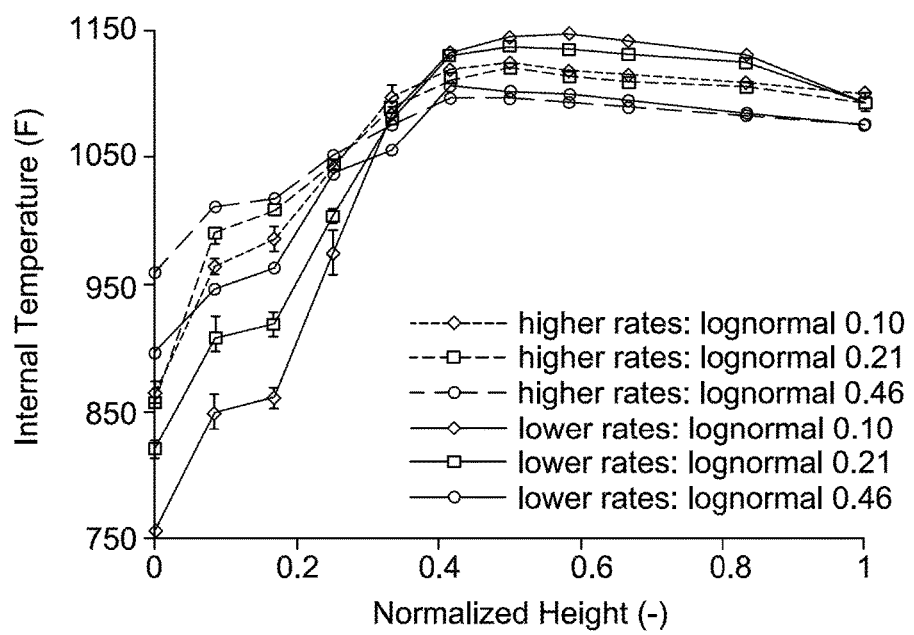
FIG. 4 is a graphical depiction of temperature profiles of varying widths of particle size distributions at two different flow rates for each set of particle size distributions with argon as the fluidizing gas.

Furthermore, FIG. 4 depicts the relative non-uniformity of the temperature profiles for the narrowest distribution that persists for gases with vastly different properties. In this Example, the gas used is argon, which has three times the viscosity, twenty times the density, one-tenth the thermal conductivity, four/hundredths the heat capacity, and twenty times the molecular weight of hydrogen.

As shown in FIG. 4, under the same operating conditions, the difference of particle size distributions can cause the distributor plugging to be accelerated for the narrowest particle size distribution, while the reactor wall build-up is expedited for the widest particle size distributions. This Example further showed that higher flow rates have associated consequences such as reduced residence time and increased dust carry-over.

This Example shows that relying on a fixed set of operating conditions (pressure, temperature, flow rates, etc.) without taking the width of particle size distributions of the granules in the bed into account can be counter-productive because temperature gradients are shown to vary significantly as the particle size distribution widths change. Thus, the results presented herein are valuable in improving the temperature control of fluidized bed reactors and hence overall reactor performance.

When introducing elements of the present disclosure or the embodiment(s) thereof, the articles "a", "an", "the" and "said" are intended to mean that there are one or more of the elements. The terms "comprising", "including" and "having" are intended to be inclusive and mean that there may be additional elements other than the listed elements.

As various changes could be made in the above without departing from the scope of the disclosure, it is intended that all matter contained in the above description and shown in the accompanying drawings shall be interpreted as illustrative and not in a limiting sense.

What is claimed is:

1. A method of controlling the axial temperature gradient of a polysilicon fluidized bed reactor having a distributor plate and a core bed, the method comprising:
   adding polysilicon seeds having a pre-determined particle size distribution into the core bed of the fluidized bed reactor;
   measuring the width of the particle size distribution of granules in the bed, wherein the granules consist of a mixture of newly added seeds and previously added seeds, the previously added seeds having grown and/or shrunk in size;
   adjusting the frequency of seed addition into the reactor to change the width of the particle size distribution of the granules in the bed such that the temperature in the fluidized bed reactor is from about 1000° F. to about 1300° F. when the granules are at a normalized height of from about 0.4 to about 1.0 in the core bed;
   depositing silicon from a thermally decomposable compound onto the previously added and newly added seeds; and
   withdrawing a polysilicon product from the bed.

2. The method of claim 1, wherein seeds are added to the reactor from about every 60 minutes to about every 600 minutes.

3. The method of claim 1, wherein the newly added polysilicon seeds have pre-determined particle sizes ranging from about 50 μm to about 600 μm.

4. The method of claim 1, wherein the width of the particle size distribution of the granules in the bed is further controlled by adjusting the frequency of polysilicon product withdrawal from the reactor.

5. The method of claim 1, wherein the polysilicon product is withdrawn from the reactor from about every 15 minutes to about every 100 minutes.

6. The method of claim 1, wherein the polysilicon product has particle sizes ranging from about 600 μm to about 2,000 μm.

7. A method of controlling the axial temperature gradient of a polysilicon fluidized bed reactor having a distributor plate and a core bed, the method comprising:
   adding polysilicon seeds having a pre-determined particle size distribution into the core bed of the fluidized bed reactor;
   measuring the width of the particle size distribution of granules in the bed, wherein the granules consist of a mixture of newly added seeds and previously added seeds, the previously added seeds having grown and/or shrunk in size;
   adjusting the pre-determined particle size distribution of the seeds to change the width of the particle size distribution of the granules in the bed such that the temperature in the fluidized bed reactor is from about 1000° F. to about 1300° F. when the granules are at a normalized height of from about 0.4 to about 1.0 in the core bed;
   depositing silicon from a thermally decomposable compound onto the previously added and newly added seeds; and
   withdrawing a polysilicon product from the bed.

8. The method of claim 7, wherein seeds are added to the reactor from about every 60 minutes to about every 600 minutes.

9. The method of claim 7, wherein the newly added polysilicon seeds have a pre-determined particle size range of from about 50 μm to about 150 μm.

10. The method of claim 7, wherein the width of the particle size distribution of the granules in the bed is further controlled by adjusting the frequency of polysilicon product withdrawal from the reactor.

11. The method of claim 7, wherein the polysilicon polysilicon product is withdrawn from the reactor from about every 15 minutes to about every 100 minutes.

12. The method of claim 7, wherein the polysilicon polysilicon product has particle sizes ranging from about 600 μm to about 2,000 μm.

13. A method of controlling the axial temperature gradient of a polysilicon fluidized bed reactor having a distributor plate and a core bed, the method comprising:
   adding polysilicon seeds having a pre-determined particle size distribution into the core bed of the fluidized bed reactor;
   measuring the width of the particle size distribution of granules in the bed, wherein the granules consist of a mixture of newly added seeds and previously added seeds, the previously added seeds having grown and/or shrunk in size;

adjusting the frequency of seed addition into the reactor and adjusting the pre-determined particle size distribution of the seeds to change the width of the particle size distribution of the granules in the bed such that the temperature in the fluidized bed reactor is from about 1000° F. to about 1300° F. when the granules are at a normalized height of from about 0.4 to about 1.0 in the core bed;

depositing silicon from a thermally decomposable compound onto the previously added and newly added seeds; and withdrawing a polysilicon product from the bed.

14. The method of claim 13, wherein seeds are added to the reactor from about every 60 minutes to about every 600 minutes.

15. The method of claim 13, wherein the Sauter mean diameter (dsm) of the granules is constant at about 925 μm.

16. The method of claim 13, wherein the polysilicon product is withdrawn from the reactor from about every 15 minutes to about every 100 minutes.

17. The method of claim 13, wherein the polysilicon product has particle sizes ranging from about 600 μm to about 2,000 μm.

* * * * *